United States Patent Office

3,672,944
Patented June 27, 1972

3,672,944
COMPOSITE SHEET
Donald F. Thompson, Atglen, George D. Quartermus, Brookhaven, and Thomas M. Quinn, West Chester, Pa., assignors to Avisun Corporation, Philadelphia, Pa.
No Drawing. Filed Mar. 25, 1970, Ser. No. 22,694
Int. Cl. B32b 27/30
U.S. Cl. 117—76 F                           9 Claims

ABSTRACT OF THE DISCLOSURE

A composite sheet comprising an oriented thermoplastic base sheet and a primer on at least one side thereof effective in securing water based Saran Overlay Materials to the base sheet, said primer comprising a composition of:

a first component comprising an acrylic interpolymer of from 50 to 60 weight percent of a $C_1$-$C_4$ alkyl methacrylate, from 50 to 40 weight percent of a $C_1$-$C_4$ alkyl acrylate and from 1 to 5 weight percent of an acid selected from the group consisting of methacrylic, acrylic and itaconic acid, the total weight percent of first component not exceeding 100;

a second component comprising a compound selected from the group consisting of an adduct of rosin and an alpha-beta unsaturated dicarboxylic acid said adduct having an acid number between about 115 and about 140 and a melting point between about 110° C. and about 180° C., partial esters of said adduct and a polyhydric alcohol, and combinations of the adduct and partial esters; the first component being present in the range of from 50% to 80% based on the weight of the first and second components, the second component being present in the range of from 50% to 20% based on the weight of first and second components and the total weight percent of the first and second components of the composition not exceeding 100;

a wax containing component selected from the group consisting of paraffin wax, microcrystalline hydrocarbon wax, and a mixture of carnauba wax and stearic acid wherein the weight ratio of wax to acid is from 82:18 to 89:11, the wax containing component being present in an amount in the range of between about ½% and about 15% based upon the combined weight of the interpolymer combined with either the adduct, the partial esters or the combinations of the adduct and the partial esters.

BACKGROUND OF THE INVENTION

Previously it has been a problem to secure vinyl polymers of vinylidene chloride, copolymers of vinylidene chloride and vinyl chloride, or copolymers of vinylidene chloride and acrylonitrile, hereinafter referred to as Saran Overlay Materials, onto oriented thermoplastic base sheets. Such Saran Overlay Materials are useful in modifying the properties of films, especially polypropylene film. Primers are now used by those skilled in the art to secure Saran Overlay Materials onto oriented thermoplastic base sheets. Heretofore such primers have been of organic solvent base and therefore not miscible in water, while the most desirable Saran Overlay Materials have been of water base. The result of attempting to use an organic solvent base primer to secure a water base Saran Overlay Material onto an oriented thermoplastic base sheet was to diminish the effectiveness of the primer with the end result that the Saran Overlay Material and base sheet would soon separate. The invention of this disclosure has been found to be effective in securing water base Saran Overlay Materials onto oriented thermoplastic base sheets.

SUMMARY OF THE INVENTION

A composite sheet comprising an oriented thermoplastic base sheet and a primer on at least one side thereof comprising a composition of:

A first component comprising an acrylic interpolymer of from 50 to 60 weight percent of a $C_1$-$C_4$ alkyl methacrylate, from 50 to 40 weight percent of a $C_1$-$C_4$ alkyl acrylate and from 1 to 5 weight percent of an acid selected from the group consisting of methacrylic, acrylic and itaconic acid, the total weight percent of the first component not exceeding 100;

A second component comprising a compound selected from the group consisting of an adduct of rosin and alpha-beta unsaturated dicarboxylic acid said adduct having an acid number between about 115 and about 140 and a melting point between about 110° C. and about 180° C., partial esters of said adduct and a polyhydric alcohol, and combinations of the adduct and partial esters; the first component being present in the range of from 50% to 80%, preferably 60% to 70%, based on the weight of the first and second components, the second component being present in the range of from 50% to 20%, preferably 40% to 30%, based on the weight of the first and second components and the total weight percent of the first and second components of the composition not exceeding 100;

A wax containing component selected from the group consisting of paraffin wax, microcrystalline hydrocarbon wax, and a mixture of carnauba wax and stearic acid wherein the weight ratio of wax to acid is from 82:18 to 89:11, the wax containing component being present in an amount in the range of between about ½% and about 15% based upon the combined weight of the interpolymer combined with either the adduct, the partial esters or the combinations of the adduct and the partial esters.

The primer of this invention is superior to the coatings broadly described in U.S. Pat. No. 3,297,477, for it has been discovered that if the adduct of rosin and an alpha-beta unsaturated dicarboxylic acid has an acid number between about 115 and about 140 and a melting point between about 110° C. and about 180° C. the resulting primer will be effective in securing water base Saran Overlay Materials to an oriented thermoplastic base sheet.

DESCRIPTION OF THE PREFERRED EMBODIMENT

The invention of this disclosure is a composite sheet comprising an oriented, non-fibrous, thermoplastic base sheet coated with the solids of the primer composition. The base sheet of this invention is a monoaxially or biaxially oriented thermoplastic resin sheet such as, but not limited to, polypropylene, polyethylene, polyethylene terephthalate, polycarbonate and the like. The surface of the base sheet is advantageously pretreated to improve adhesion between the primer and the base sheet. Treatments of the base sheet surface include acid or oxidizing treatments and electrical discharge treatment.

Primer components

The acrylic interpolymer of this invention is from 50 to 60 weight percent of a $C_1$-$C_4$ alkyl methacrylate, from 50 to 40 weight percent of a $C_1$-$C_4$ alkyl acrylate and from 1 to 5 weight percent of an acid selected from the group consisting of methacrylic, acrylic and itaconic acid, the total weight percent of interpolymer not exceeding 100. The preferred $C_1$-$C_4$ alkyl methacrylate is methyl methacrylate. The preferred $C_1$-$C_4$ alkyl acrylate is ethyl acrylate and the prefrred acid is methacrylic acid.

The preferred rosin is ordinarily wood rosin or gum rosin, but many include aquivalent materials, for example, abietic acid, crystalline abietic acid, isomerized rosin and polymerized rosin.

The alpha-beta unsaturated dicarboxylic acid suitable for use in the invention of this disclosure includes but is not limited to such acids as fumaric acid, maleic anhydride, citraconic acid, citraconic anhydride and mesaconic acid.

The preferred partial esters of the adducts of reson and an alpha-beta unsaturated dicarboxylic acid are formed with polyhydric alcohols which include, for example, ethylene glycol, propylene glycol, butyl glycol, diethylene glycol, triethylene glycol, tetraethylene glycol, glycerol, diglyceryl ether, pentaerythritol, sorbitol and manitol. Glycerol or mixtures containing active amounts of glycerol are preferred on the basis of availability and cost.

The wax containing component is selected from the group consisting of paraffin wax, microcrystalline hydrocarbon wax, and a mixture of carnauba wax and stearic acid wherein the weight ratio of wax to acid is from 82:18 to 89:11.

The composition of this disclosure may also contain a small amount of morpholine as an aid to emulsification. The morpholine is evaporated when the primer is applied to the film and dried, therefore, it does not appear in the primer on the film. Other emulsifying aids such as the fatty partial esters of hexitans and polyoxyethylene derivates thereof, which are found to be useful for emulsifying the coatings described in U.S. Pat. No. 3,297,477, can be used as well. It is to be understood that although trace amounts of the above emulsification aids may be present in the composition of this disclosure they do not constitute a part of the invention.

Water dispersible clays or the like may also be incorporated in the composition of this disclosure to reduce the tendency of the base sheet coated with primer to block while stored in a roll. The water dispersible clays are generally added in amounts ranging from 1 to 5% based on the weight of the first and second components.

Preparation of primer components

The acrylic interpolymer of this invention is advantageously formed by an emulsion polymerization technique that gives an aqueous product. In general, the techniques of emulsion polymerization in an aqueous system are well known in the art. Generally such a system contains the monomers to be copolymerized, water, an initiator and activator, e.g., ammonium persulfate and metasodium bisulfite, and a dispersing agent, e.g., sodium lauryl sulfate. Polymerization is effected by combining all the components with constant stirring. At completion of the polymerization reaction, if a more dilute dispersion is desired additional water may be added.

The adduct of rosin and an alpha-beta unsaturated dicarboxylic acid is readily formed by adding the acid to molten rosin and holding the rosin in the molten state until the adduct is formed. In general, an amount of acid ranging from 10% to 50%, preferably about 25%, based on the weight of the rosin is used. It is important that the rosin adduct have an acid number between about 115 and about 140 and a melting point of between about 110° C. and about 180° C., so that the rosin adduct can be readily dispersed in an aqueous alkaline solution; such dispersion is then compatible with the aqueous dispersion of acrylic interpolymer. The rosin adduct formed is a hard, high melting, modified rosin which, in combination with the acrylic interpolymer of this invention, forms a very desirable coating for the clear, oriented base sheet.

Partial esterification of the rosin-acid adduct may be employed, if necessary, to obtain an acid number between about 115 and 140. For example, partial esterification may be effected by heating a polyhydric alcohol or mixture of polyhydric alcohols with the rosin-acid adduct at a temperature of about 250° C. in an inert atmosphere. In general, the amount of polyhydric alcohol used is the least amount required to produce a rosin-acid adduct having an acid number between about 115 and about 140. It is to be understood that with some methods of preparation the rosin-acid adduct will have an acid number and melting point within the desired range, but in other cases, it may be necessary to further esterify the rosin-acid adduct to lower its acid number to the desired range. The term partial ester as used in the specification and claims refers to the esterified rosin-acid adduct formed when the rosin-acid adduct is combined with polyhydric alcohols.

Both the rosin-acid adduct and the partial ester thereof are dispersed in aqueous medium as follows:

Water is heated to about 100° C. While agitating the hot water, about 10% to about 50%, based on the weight of hot water, of finely-powered rosin-acid adduct or partial ester thereof is added slowly and stirring is continued until a clear solution is formed. Ammonium hydroxide is then added to the water in an amount to produce a pH of about 9. The solution is allowed to cool and, if it becomes cloudy, ammonium hydroxide is added until it clears.

The wax containing component of the invention of this disclosure is incorporated in the aqueous primer composition in the form of an emulsion. The wax containing component may be formed as follows: A mixture of carnauba wax and stearic acid is melted and held at about 100° C. Morpholine is then added, and the mixture is stirred until it appears to be homogenous. Boiling water is then added until a thick water-in-wax emulsion is formed. Addition of water is continued until inversion of the emulsion into a wax-in-water emulsion takes place. Addition of water is then continued until a clear emulsion is formed, after which it is cooled.

Alternatively, the wax emulsion may be formed as follows: Microcrystalline wax, for example, is melted and held at about 100° C. Emulsifying agents, for example, 6.8% of sorbitan monostearate or 8.5% of polyoxyethylene sorbitan monostearate, based on the weight of the wax are added. When the wax and the emulsifiers are completely homogenous, boiling water is slowly added with agitation until a thick water-in-wax emulsion is formed. The addition of water is continued until inversion of the emulsion to a wax-in-water emulsion occurs. When the inversion occurs water may be added more rapidly. After the desired amount of water is added, the emulsion is immediately cooled in an ice bath with mild agitation. The quenching produces a preferred particle size for the wax. Though wax particles of smaller or larger sizes will be adequate for coating systems used in some applications, the preferred average wax particle size ranges between 0.1 and 0.2 micron. This range is preferred since smaller wax particles tend to become too soluble in the aqueous coating composition and will not migrate to the coating surface, thus causing lower heat-seal strengths and loss of slip characteristics. Larger particles tend to produce a hazy film and higher initial heat seal temperature requirements.

Primer preparation

The preparation of the primer of this invention is as follows: Weighed quantities of the rosin-acid adduct and the acrylic interpolymer are mixed, and then the desired quantity of the wax containing component is added. Generally from 1 to 5%, based on the weight of rosin-acid adduct and acrylic interpolymer, of paraffin wax or microcrystalline hydrocarbon wax is used, and preferably 2 to 3% is used. Alternatively, from 6 to 8%, based on the weight of rosin-acid adduct and acrylic interpolymer, of a mixture of carnauba wax and stearic acid wherein the weight ratio of wax to acid is from 82:18 to 89:11 is used. Additional water is then added to bring the desired solids concentration to a range of from about 5 to about 50 weight percent, depending on the method of primer application to be used and the desired primer weight.

Composite sheet preparation

The primer of this disclosure may be applied to an oriented thermoplastic base sheet using any one of numerous methods well known to those skilled in the art. For example, application of the primer may be accomplished by using a Gravure Roller to transfer the primer from a reservoir to the oriented thermoplastic base sheet in a continuous operation. Alternatively, the primer may be applied by hand by using a brush or similar means. Either one or both sides of the oriented thermoplastic base sheet may be coated.

In the same manner water base Saran Overlay Materials may then be applied to the primer and dried to give a thermoplastic base sheet having modified properties. Suitable commercially available water base Saran Overlay Materials are those manufactured by W. R. Grace & Company identified as Daran 210, 211 and 212.

We claim:

1. A composite sheet comprising an oriented thermoplastic base sheet, a primer on at least one side thereof, and a water based vinylidene chloride polymer on said primer, said primer comprising a composition of:

a first component comprising an acrylic interpolymer of from 50 to 60 weight percent of a $C_1$–$C_4$ alkyl methacrylate, from 50 to 40 weight percent of a $C_1$–$C_4$ alkyl acrylate and from 1 to 5 weight percent of an acid selected from the group consisting of methacrylic, acrylic and itaconic acid, the total weight percent of first component not exceeding 100;

a second component comprising a compound selected from the group consisting of an adduct of rosin and an alpha-beta unsaturated dicarboxylic acid wherein said adduct has an acid number between about 115 and about 140 and a melting point between about 110° C. and about 180° C., partial esters of said adduct and a polyhydric alcohol, and combinations of said adduct and said partial esters; said first component being present in the range of from 50% to 80% based on the weight of said first and second components, said second component being present in the range of from 50% to 20% based on the weight of said first and second components and the total weight percent of the first and second components of the composition not exceeding 100;

a wax containing component selected from the group consisting of paraffin wax, microcrystalline hydrocarbon wax, and a mixture of carnauba wax and stearic acid wherein the weight ratio of wax to acid is from 82:18 to 89:11, the wax containing component being present in an amount in the range of between about ½% and about 15% based upon the combined weight of the interpolymer combined with either the adduct, the partial esters or the combinations of the adduct and the partial esters.

2. The composite sheet of claim 1 wherein the said alpha-beta unsaturated dicarboxylic acid is fumaric acid.

3. The composite sheet of claim 1 wherein said wax is microcrystalline hydrocarbon wax dispersed at the surface of the coating and having an average particle size of 0.1 to 0.2 micron.

4. The composite sheet of claim 1 wherein said oriented thermoplastic base sheet is a biaxially oriented polypropylene film.

5. The composite sheet of claim 1 wherein said acid of said first component is methacrylic acid.

6. The composite sheet of claim 1 wherein said wax containing component is paraffin wax present in the range of from about 1% to about 5% based on the combined weight of said acrylic interpolymer combined with either said adduct, said partial esters or said combination of said adduct and said partial esters.

7. The composite sheet of claim 1 wherein said wax containing component is microcrystalline hydrocarbon wax present in the range of from about 1% to about 5% based on the combined weight of said acrylic interpolymer combined with either said adduct, said partial esters or said combination of said adduct and said partial esters.

8. The composite sheet of claim 1 wherein the wax containing component is a mixture of carnauba wax and stearic acid present in the range from 6% to about 8% of said mixture based on the combined weight of said interpolymer combined with either said adduct, said partial esters or said combination of said adduct and said partial esters the weight ratio of wax to acid in said mixture beng from 82:18 to 89:11.

9. The composite sheet of claim 1 wherein, in said first component, said $C_1$–$C_4$ alkyl methacrylate is methyl methacrylate, said $C_1$–$C_4$ alkyl acrylate is ethyl acrylate, and said acid is methacrylic acid;

in said second component, said alpha-beta unsaturated dicarboxylic acid is fumaric acid, said interpolymer of the first component being present in the range of from 60% to 70% based on the combined weight of said first and second components; said adduct of rosin and fumaric acid, said partial esters or said combinations of said adduct and said partial esters being present in the range of from 40% to 30% based on the combined weight of said first and second components;

and in said wax containing component, the wax is from 2 to 3% of a microcrystalline hydrocarbon wax, dispersed at the surface of the coating and having an average particle size of 0.1 to 0.2 micron.

References Cited
UNITED STATES PATENTS

| | | | |
|---|---|---|---|
| 3,297,477 | 1/1967 | Barkis et al. | 117—168 X |
| 3,498,822 | 3/1970 | Barkis et al. | 117—161 U TX |
| 2,845,398 | 7/1958 | Brown et al. | 260—28.5 R |
| 3,318,721 | 5/1967 | Lineburg | 117—161 UTX |
| 3,328,196 | 6/1967 | Sincock | 117—161 UTX |
| 3,353,991 | 11/1967 | Shelburg et al. | 117—161 UTX |

WILLIAM D. MARTIN, Primary Examiner

R. HUSACK, Assistant Examiner

U.S. Cl. X.R.

117—47 A, 68, 91, 92, 138.8 E, F, A; 260—23 AR, 27 R, 28.5 R